(12) United States Patent
Kim et al.

(10) Patent No.: US 6,503,033 B1
(45) Date of Patent: Jan. 7, 2003

(54) PARALLEL MECHANISM STRUCTURE FOR CONTROLLING THREE-DIMENSIONAL POSITION AND ORIENTATION

(75) Inventors: Jongwon Kim, 110-402, Hyundae-Apartment, Suso-Dong, Kangnam-Ku, 135-220, Seoul (KR); Chongwoo Park, 789-29, Yaoksam-Dong, Kangnam-Ku, 135-080, Seoul (KR); Jae Chul Hwang, 196-238, Bongchun-11-Dong, Kwanak-Ku, 151-061, Seoul (KR); Jin-Sung Kim, Seoul (KR); Young-Oh Han, Kyonggi-do (KR)

(73) Assignees: Jongwon Kim, Seoul (KR); Chongwoo Park, Seoul (KR); Jae Chul Hwang, Seoul (KR)

( * ) Notice: Subject to any disclaimer, the term of this patent is extended or adjusted under 35 U.S.C. 154(b) by 17 days.

(21) Appl. No.: 09/857,462

(22) PCT Filed: Sep. 7, 2000

(86) PCT No.: PCT/KR00/01021

§ 371 (c)(1),
(2), (4) Date: Jun. 5, 2001

(87) PCT Pub. No.: WO01/98850

PCT Pub. Date: Dec. 27, 2001

(30) Foreign Application Priority Data

Jun. 21, 2000 (KR) ........................................ 2000-34096

(51) Int. Cl.[7] ............................. B23C 1/06; B23C 1/12; B23Q 1/25; B25J 9/10; B25J 11/00
(52) U.S. Cl. ........................ 409/201; 409/235; 409/211; 409/216; 408/236; 74/479.01; 74/490.08; 248/653; 901/23

(58) Field of Search ................................. 409/201, 235, 409/211, 216; 408/236, 234; 74/490.05, 490.03, 479.01, 490.06, 490.01, 490.07, 490.08, 490.09, 480 R; 901/22, 23; 248/653, 654, 631; 414/917

(56) References Cited

U.S. PATENT DOCUMENTS

| 5,354,158 | A | | 10/1994 | Sheldon et al. | |
| 5,401,128 | A | | 3/1995 | Lindem et al. | |
| 5,797,191 | A | * | 8/1998 | Ziegert | 33/503 |
| 6,135,683 | A | * | 10/2000 | Kim et al. | 409/235 |
| 6,196,081 | B1 | * | 3/2001 | Yau | 74/479.01 |

FOREIGN PATENT DOCUMENTS

EP          0 674 969        2/1995

* cited by examiner

*Primary Examiner*—A. L. Wellington
*Assistant Examiner*—Erica E Cadugan
(74) *Attorney, Agent, or Firm*—Dickstein Shapiro Morin & Oshinsky LLP

(57) ABSTRACT

Disclosed is a parallel mechanism structure for controlling three-dimensional position and orientation. In the parallel mechanism structure according to the present invention, three links are connected to the main spindle of the mechanism and driven in vertical and horizontal direction, with a consecution that the main spindle connected to the three links achieves the six d.o.f motions. The structure includes three links comprised of a first link transferred along a circular vertical guide and second and third links transferred along corresponding rectilinear vertical guides and a circular horizontal guide on which the circular vertical guide and the two rectilinear vertical guides are horizontally transferred.

3 Claims, 9 Drawing Sheets

PARALLEL MECHANISM STRUCTURE FOR CONTROLLING THREE-DIMENSIONAL POSITION AND ORIENTATION

TECHNICAL FIELD

The present invention relates to a parallel mechanism structure for controlling three-dimensional position and orientation.

BACKGROUND ART

As well known, generally, a parallel mechanism structure for controlling three-dimensional position and orientation has been chiefly studied for a work machine for processing a work object and a robot manipulator for assembling and transferring an object.

By way of example, the work machine functions to process a material, so that the material takes a desired shape or form. The work machine is composed of a machine body and a tool, in which the machine body operates by virtue of power-and a cutting tool works the material. At this time, it is essentially required that three-dimensional position and orientation of the tool for the working material be controlled in the work machine.

First, an explanation of a serial mechanism structure developed before a parallel mechanism structure has been emerged will be described. FIG. 1 is an exemplary view illustrating a conventional serial mechanism structure. As shown, the conventional serial mechanism structure, each link from a base 11 to a main spindle 12 has a cantilever structure at a perpendicular angle. The serial mechanism structure has some advantages that the working space is large and the software and control devices for controlling the structure are configured in a simple manner. When compared with the conventional serial mechanism structure, however, the parallel mechanism structure where the base and the main spindle are connected by means of a plurality of links has the following advantages. By these reasons, the studies for the newly proposed parallel mechanism structure have been dynamically made.

The advantages of the parallel mechanism structure are as follows: First, as the mass of inertia of a moving part decreases, the velocity and the acceleration thereof can increase; Second, as the main spindle and the base are connected by means of the plurality of links and only a tension force and a compressing force, instead of a bending force, are applied to each link, the stiffness of the machine can increase; Third, as the error of each link of the parallel mechanism structure is reflected to the main spindle on the average, the accuracy thereof can be more improved, when compared with the serial mechanism structure where the error of each link is accumulated; and Forth, when compared with most of the work machine adopting the serial mechanism structure are three-axis right angled coordinate machine, the parallel mechanism structure is basically configured to carry out six degree-of-freedom(d.o.f) motions, which can at a time work five-face and five-axis in a complete shape.

FIG. 2 is an exemplary view illustrating a hexapod structure as the conventional parallel mechanism structure. As shown, in the hexapod structure the main spindle 22 and the base 21 are connected by means of six links, and the expansion of the links enables the six d.o.f motions. The hexapod structure is called 'Stewart platform'. The parallel mechanism work machine adopting the 'Stewart platform' has been manufactured by Giddings & Lewis Co. in U.S.A.

The work machine achieves the six d.o.f motions, but has the disadvantages that the working space is very small and particularly, the main spindle is inclined up to about 15° and cannot continuously sweep the lateral surfaces of the workpiece over a full 360 degree range.

Also, an 'octahedral hexapod' structure has been developed by the co-operation of the Ingersoll inc. and NIST in U.S.A. The structure is reverse to the 'Stewart platform' structure. In this case, the working space is narrow and the main spindle has the inclination angle of 30° and additionally, the work bench is inclined at the angle of 15°. However, it is noted that the whole inclination of the 'octahedral hexapod' structure is the angle of 45°. The limitation of the hexapod structure is due to the problems that the six links connected to the main spindle interfere with each other and the rotating angle of the ball joint connecting the main spindle and the link is fixed.

A newly developed parallel mechanism structure where the inclination angle of the main spindle extends up to an angle of 90° is disclosed in Korean Patent No. 237553 filed by the same applicant. FIGS. 3a and 3b are exemplary views illustrating the conventional parallel mechanism structure where the main spindle is inclined up to an angle of 90°, wherein FIG. 3a shows the main spindle of the inclination angle of 0° and FIG. 3b shows the main spindle of the inclination angle of 90°.

As shown, three links 73, 74 and 75 connected to a main spindle 72 are transferred vertically along corresponding rectilinear vertical guides 83, 84 and 85, and the three vertical guides 83, 84 and 85 are transferred along a round horizontal guide 76 for the horizontal transfer at an angle of 360°. The three links 73, 74 and 75 are connected by S-R-P joints from the main spindle 72, and the vertical guides 83, 84 and 85 are connected by a P' joint with the circular horizontal guide 76. The P joint and the P' joint are driven and thus, by the six driving joints, the six d.o.f motions of the main spindle 72 can be achieved.

In this case, the 'S' represents a spherical joint for a three-dimensional rotation. the 'R' represents a revolution joint for an one-dimensional rotation, the 'P' represents a prismatic joint for an one-dimensional rectilinear transfer, and the 'P'' represents the prismatic joint for a circular transfer.

In the parallel mechanism structure as shown in FIGS. 3a and 3b, any (for example, the reference numeral '85') of the vertical guides 83, 84 and 85 is arranged downward on the basis of the horizontal guide 76 and the other vertical guides 83 and 84 are arranged upward on the basis of the horizontal guide 76. The arrangement of the three horizontal guides 83, 84 and 85 in the different directions enables the limitation of the working space to be overcome, thereby ensuring a large working area.

In the parallel mechanism structure as shown in FIGS. 3a and 3b, also, the six d.o.f motions of the main spindle can be carried out with three actuators for horizontally transferring the rectilinear vertical guides 83, 84 and 85 on the vertical guide 76 and three actuators for vertically transferring the three links 73, 74 and 75 connected to the main spindle on the rectilinear vertical guides 83, 84 and 85. With With the conventional parallel mechanism structure as shown in FIGS. 3a and 3b, the inclination angle of the main spindle is an angle of 90°, as shown in FIG. 3b and thereby, the five-face work except the bottom face is possible.

However, even in case of the inclination angle of 90° of the main spindle, the bottom-face work for the material is not possible. Therefore, there is a need for the extension of the inclination angle of the main spindle.

Additionally, the conventional parallel mechanism structure has limitations as a motion simulator for simulating a real motion, due to the restriction of the inclination angle of the main spindle.

DISCLOSURE OF THE INVENTION

An object of the invention is to provide a parallel mechanism structure for controlling three-dimensional position and orientation which is capable of extending the inclination angle of a main spindle in the parallel mechanism structure as shown in FIGS. 3a and 3b, whereby in the case where it is applied in a work machine, the bottom-face work for a material is possible and in the case it is applied in a motion simulator, the inclination angle of the main spindle rotates at ±360°.

To accomplish this and other objects of the present invention, there is provided a parallel mechanism structure for controlling three-dimensional position and orientation in which three links are connected to a main spindle of the mechanism and driven in two directions, namely, vertical and horizontal directions, thereby achieving six d.o.f motions, which includes: the three links comprised of a first link transferred along a circular vertical guide and second and third links transferred along corresponding rectilinear vertical guides; and a circular horizontal guide on which the circular vertical guide and the two rectilinear vertical guides are horizontally transferred.

In the parallel mechanism structure according to the present invention, the first link is connected by three-dimensional rotation joint-one-dimensional rotation joint-one-dimensional circular transfer joint (S-R-P'), the second and third links are connected by three-dimensional rotation joint-one-dimensional rotation joint-one-dimensional rectilinear transfer joint (S-R-P), and the circular vertical guide and the two rectilinear vertical guides are connected by the one-dimensional circular transfer joint P' to the circular horizontal guide.

BRIEF DESCRIPTION OF THE DRAWINGS

The invention will further be described by way of example and with reference to the following drawings, in which.

FIGS. 3a and 3b are exemplary views illustrating the conventional parallel mechanism structure where a main spindle is inclined up to an angle of 90°, wherein FIG. 3a shows the main spindle of the inclination angle of 0° and FIG. 3b shows the main spindle of the inclination angle of 90°;

FIGS. 4a to 4d are exemplary views illustrating a parallel mechanism structure according to the present invention where a main spindle is inclined up to at an angle of 360°, wherein FIG. 4a shows the main spindle of the inclination angle of 0°, FIG. 4b shows the main spindle of the inclination angle of 90°, FIG. 4c shows the main spindle of the inclination angle of 180°, and FIG. 4d shows the main spindle of the inclination angle of 270°.

Hereinafter, an explanation of a parallel mechanism structure for controlling three-dimensional position and orientation will be in detail discussed with reference to FIGS. 4a to 4d.

BEST MODE FOR CARRYING OUT THE INVENTION

Figure 4A:
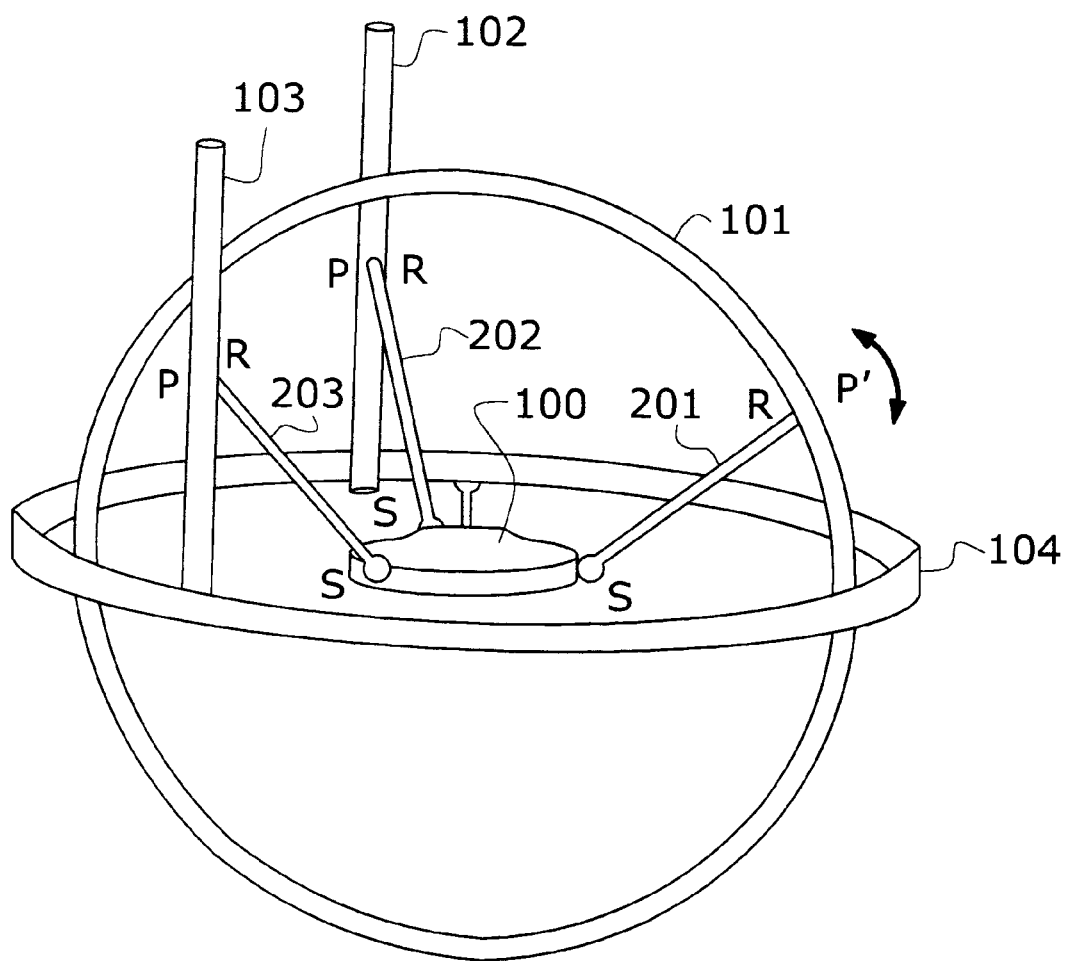
Figure 4B:
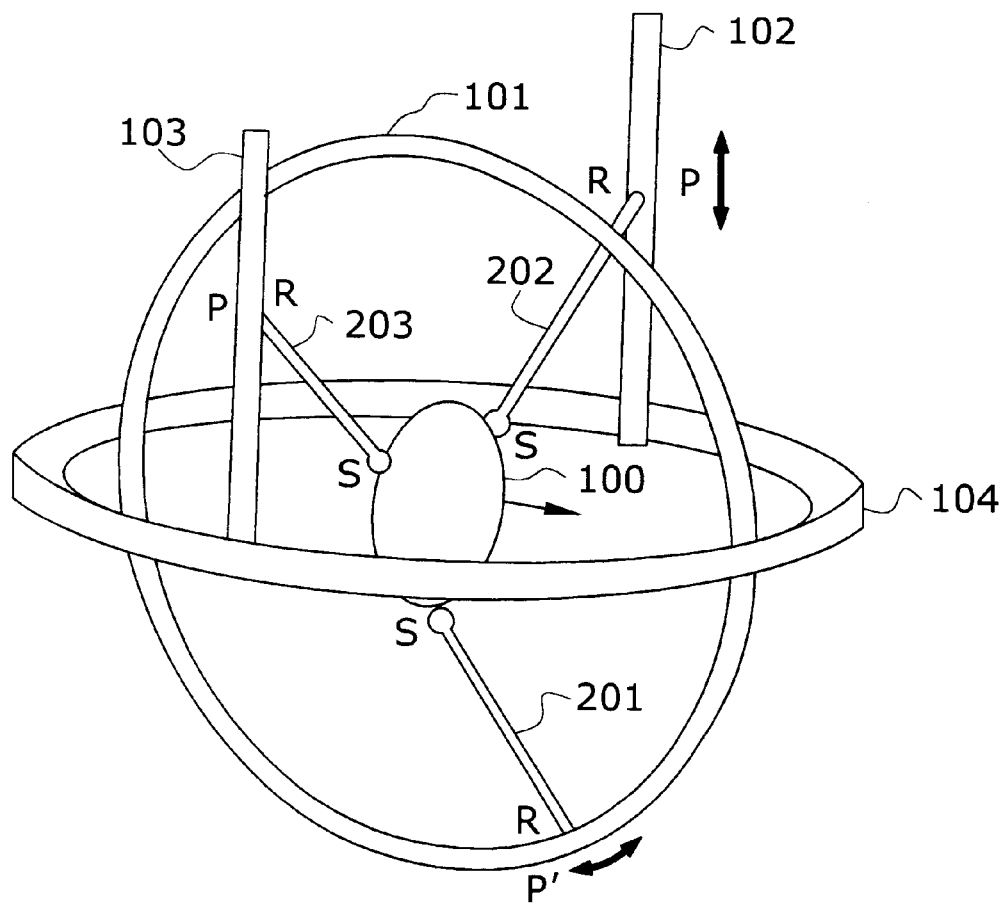
Figure 4C:
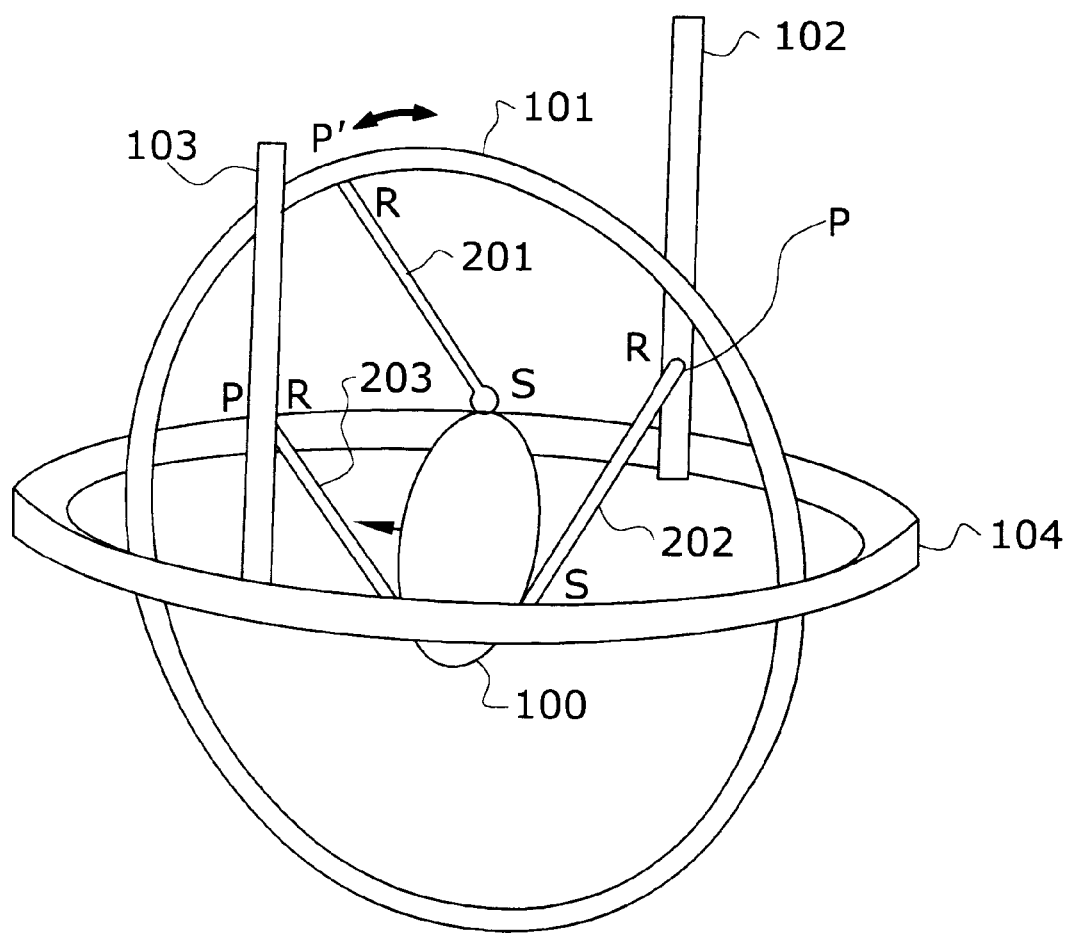
Figure 4D:
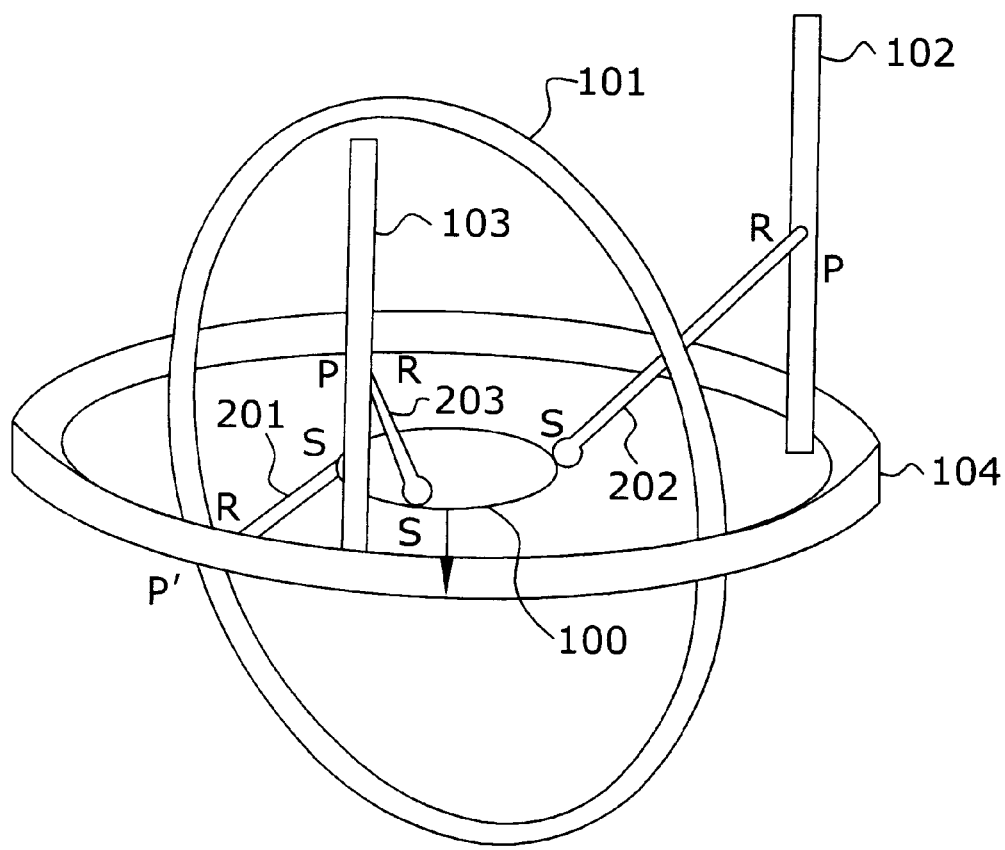

FIGS. 4a to 4d are exemplary views illustrating a parallel mechanism structure according to the present invention where a main spindle 100 is inclined up to at an angle of 360°, wherein FIG. 4a shows the main spindle of the inclination angle of 0°, FIG. 4b shows the main spindle of the inclination angle of 90°, FIG. 4c shows the main spindle of the inclination angle of 180°, and FIG. 4d shows the main spindle of the inclination angle of 270°.

In the parallel mechanism structure according to the present invention, basically, three links are connected to the main spindle of the mechanism and driven in vertical and horizontal direction, with a consecution that the main spindle connected to the three links achieves the six d.o.f motions.

According to the present invention, any link 201 of the three links 201, 202 and 203 is driven, thus to be transferred along a circular vertical guide 101 and the other links 202 and 203 are driven, thus to be transferred along rectilinear vertical guides 102 and 103. Furthermore, the circular vertical guide 101 and the rectilinear vertical guides 102 and 103 are driven, thus to be transferred along a circular horizontal guide 104.

To this end, the first link 201, which is transferred along the circular vertical guide 101, is connected by three-dimensional rotation joint-one-dimensional rotation joint-one-dimensional circular transfer joint (S-R-P'), and the second and third links 202 and 203, which are transferred along the rectilinear vertical guides 102 and 103, are connected by three-dimensional rotation joint-one-dimensional rotation joint-one-dimensional rectilinear transfer joint (S-R-P).

Also, the circular vertical guide 101 and the two rectilinear vertical guides 102 and 103 are connected by the one-dimensional circular transfer joint P' to the circular horizontal guide 104, thereby being transferred on the circular horizontal guide 104 at an angle of 360°.

In the parallel mechanism structure according to the present invention, a driving joint is the one-dimensional circular transfer joint P' of the first link 201, which drives the first link 201, such that the first link 201 is transferred in vertical and circular form on the circular vertical guide 101 and also drives the one-dimensional rectilinear transfer joint P of the second and third links 202 and 203, such that the second and third links 202 and 203 are transferred in vertical and rectilinear form on the rectilinear vertical guides 102 and 103. Also, the one-dimensional circular transfer joint P' as the driving joint of the circular vertical guide 101 and the two rectilinear vertical guides 102 and 103 drives the circular vertical guide 101 and the two rectilinear vertical guides 102 and 103, such that they are transferred horizontally on the circular horizontal guide 104. Therefore, total six actuators are needed and by six driving joints, the main spindle can achieve the six d.o.f motions.

Figure 1:
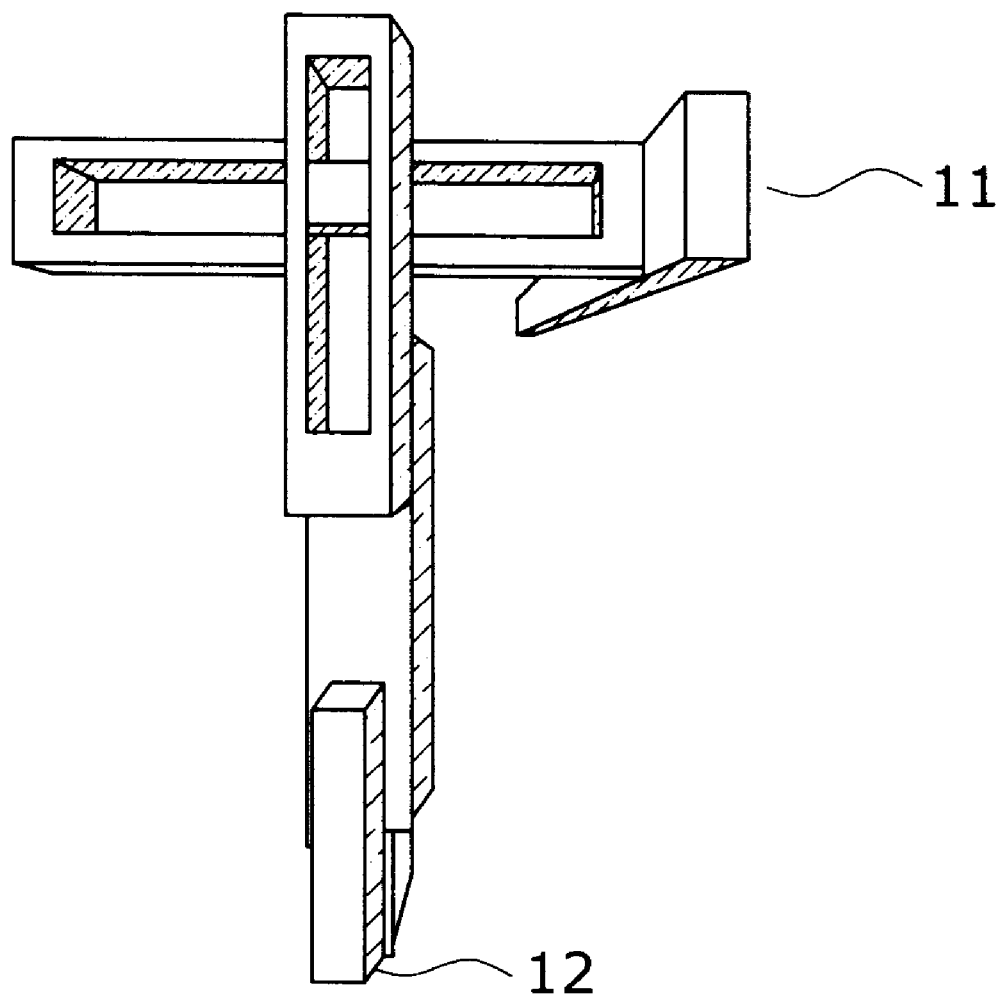
FIG. 1 is an exemplary view illustrating a conventional serial mechanism structure.
Figure 2:
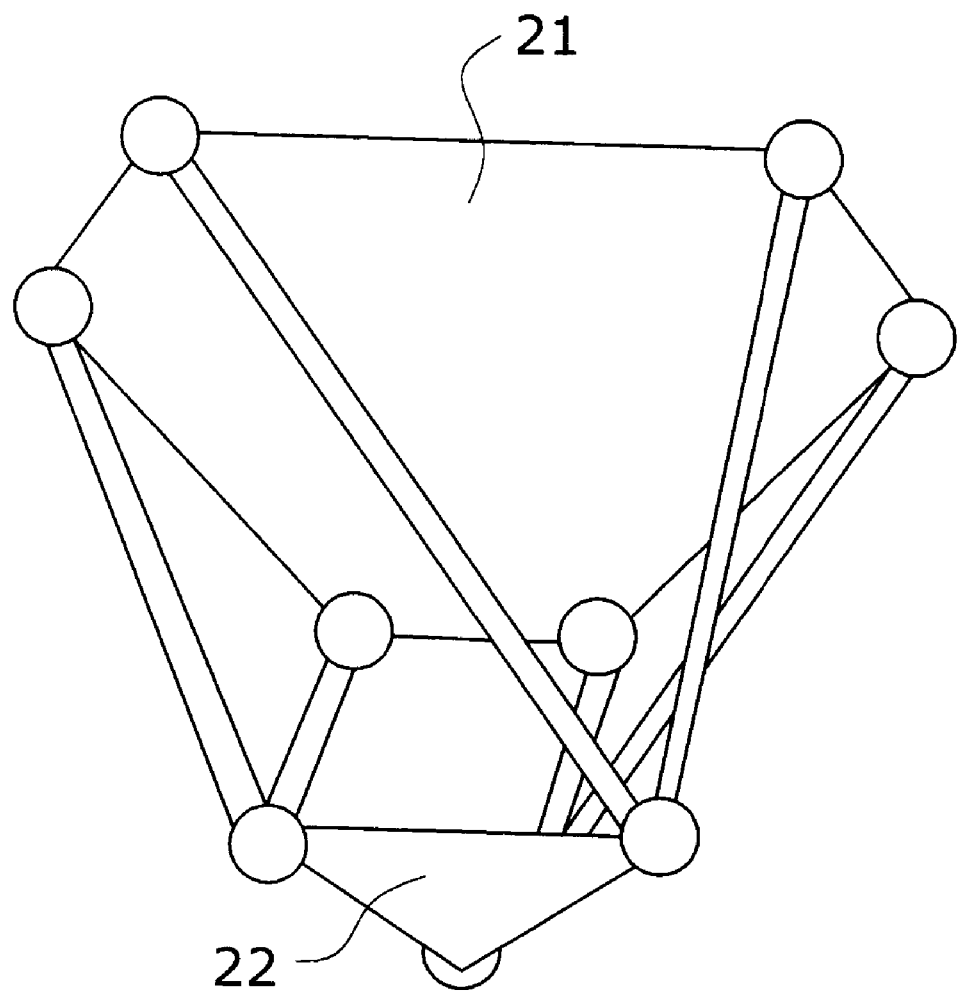
FIG. 2 is an exemplary view illustrating a hexapod structure as a conventional parallel mechanism structure.
Figure 3A:
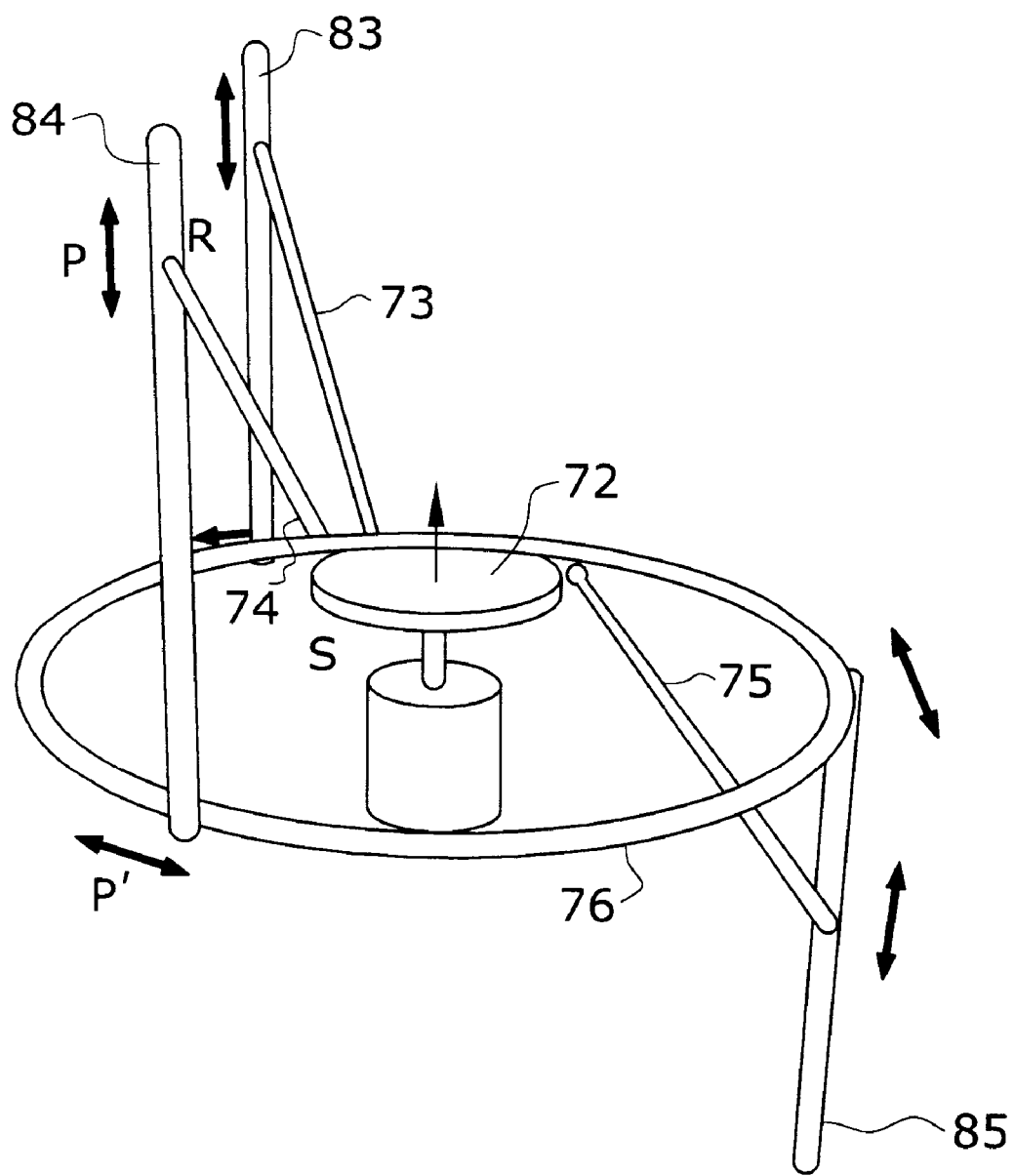
Figure 3B:
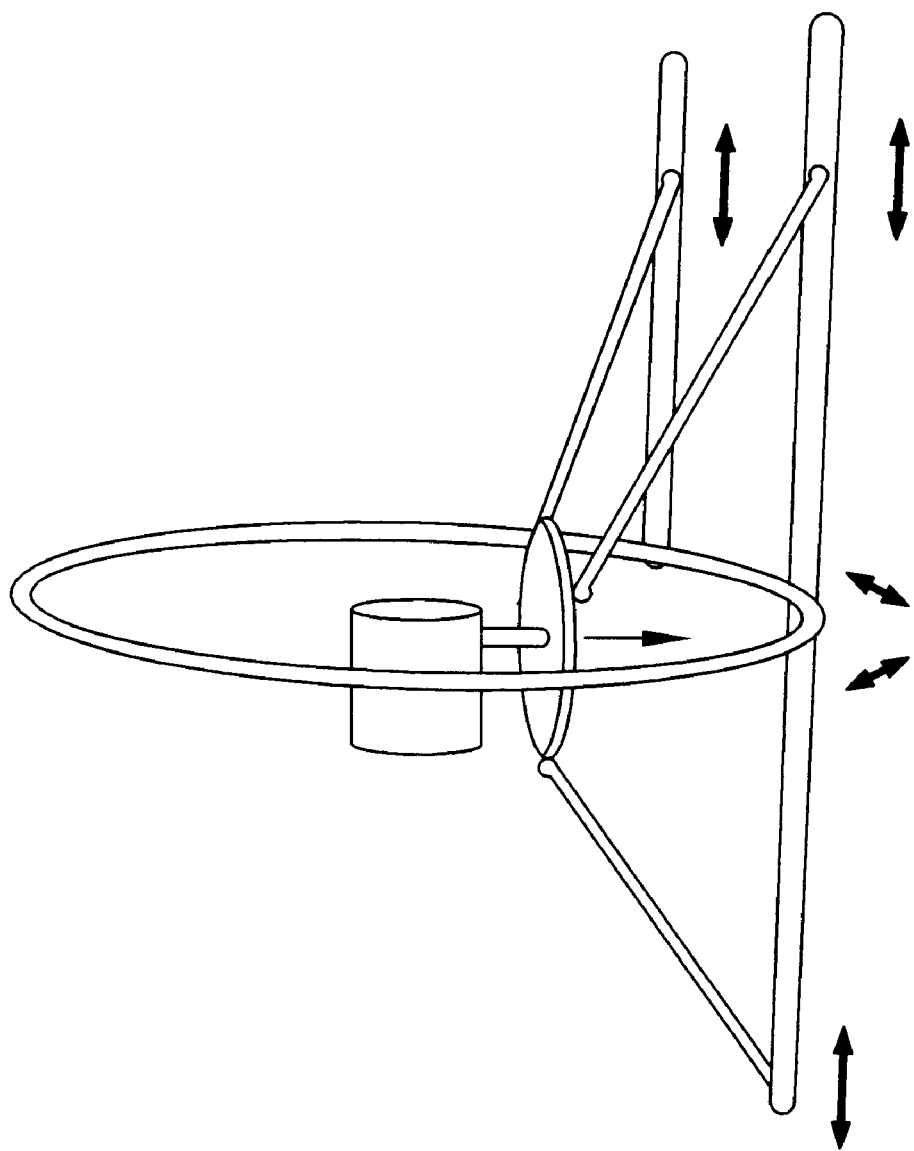

The parallel mechanism structure of the present invention as shown in FIGS. 4a to 4d is embodied by modifying the vertical guide 85, which is disposed downward on the basis of the horizontal guide 76, in the conventional parallel mechanism structure as shown in FIGS. 3a and 3b, to take a circular form.

With the parallel mechanism structure according to the present invention, the main spindle extends over the inclination angle of 90° and freely rotates up to ±360° or more. FIGS. 4c and 4d show the inclination angles of 180° and 270°.

Figure 5:
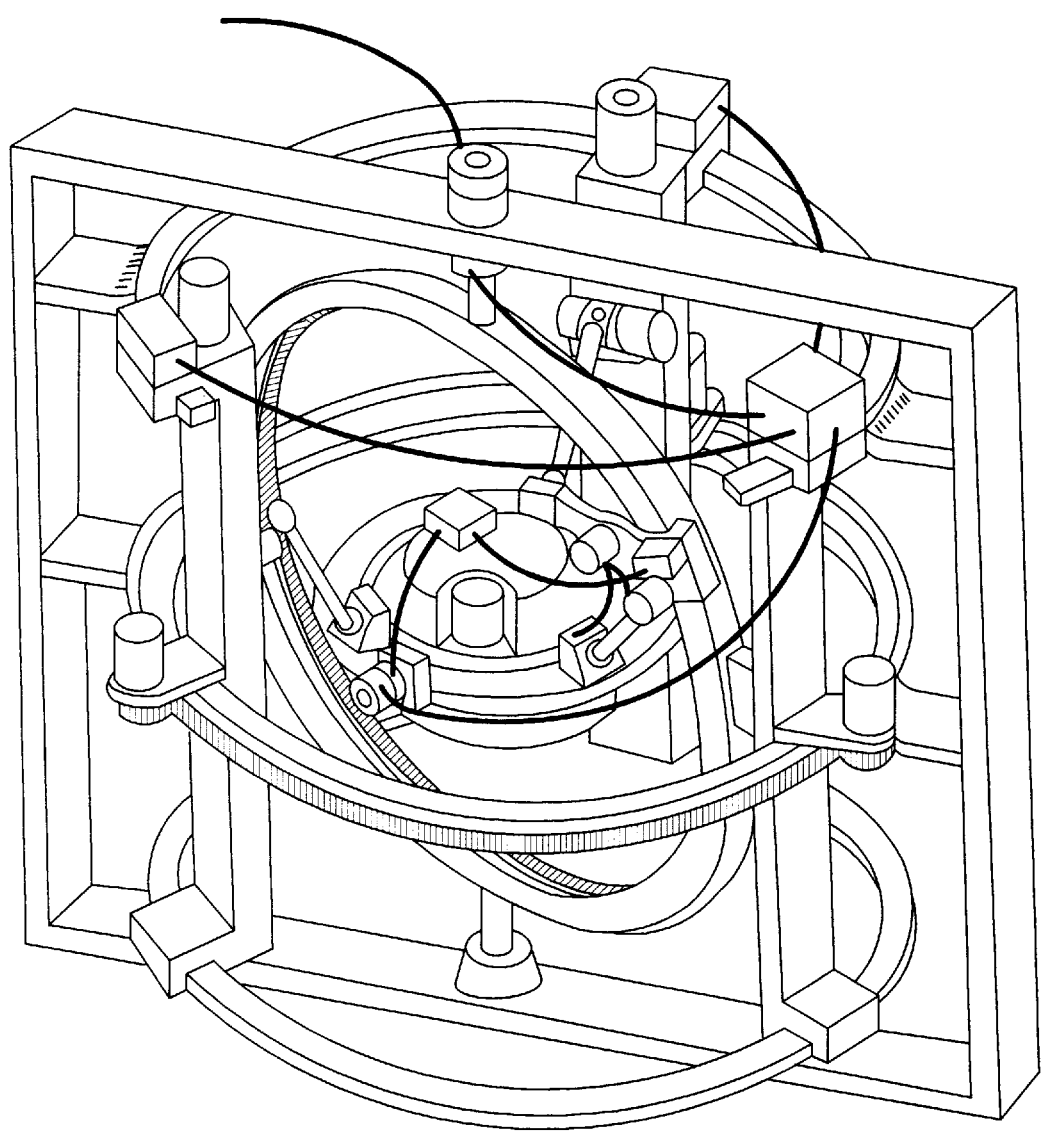
FIG. 5 is an imaginary view illustrating a motion simulator manufactured by the adoption of the parallel mechanism structure according to the present invention.

FIG. 5 is an imaginary view illustrating a motion simulator manufactured by the adoption of the parallel mechanism structure according to the present invention. In case where the parallel mechanism structure of the present invention is applied on the motion simulator, the motion simulator can freely rotate up to ±360° or more.

As set forth in the above, a parallel mechanism structure for controlling three-dimensional position and orientation is capable of extending the inclination angle of 90° of a main spindle in the conventional parallel mechanism structure, whereby in the case where it is applied in a work machine, the bottom-face work for a material is possible. Moreover, the parallel mechanism structure according to the present invention may be applied to flight simulators or amusement riders.

What is claimed is:

1. A parallel mechanism structure for controlling three-dimensional position and orientation in which three links are connected to a main spindle of the mechanism and driven in vertical and horizontal directions, thereby achieving six degree-of-freedom motions of the spindle, the said structure comprising:

the said three links comprised of a first link transferred along a circular vertical guide and second and third links transferred along corresponding rectilinear vertical guides; and a circular horizontal guide on which the said circular vertical guide and the two rectilinear guides are horizontally transferred.

2. The parallel mechanism structure in claim 1, wherein the said first link is connected to the spindle by a three-dimensional rotation joint, and is connected to the circular vertical guide by a one dimensional rotation joint and a one dimensional circular transfer joint, the second and third links are connected to the spindle by three-dimensional rotation joints, and are connected to their corresponding rectilinear vertical guides by one dimensional rotation joints and one dimensional rectilinear transfer joints, and the said circular vertical guide and the two rectilinear vertical guides are connected by a one-dimensional circular transfer joint to the said circular horizontal guide.

3. The parallel mechanism structure in claim 2, wherein the said six degree-of-freedom motions of the said main spindle are carried out by driving the said one-dimensional circular transfer joint of the said first link, the said one-dimensional rectilinear transfer joints of the said second and third links, and the said one-dimensional circular transfer joint of the said circular vertical guide and the two rectilinear guides, respectively.

* * * * *